(12) United States Patent
Kim et al.

(10) Patent No.: US 11,894,532 B2
(45) Date of Patent: Feb. 6, 2024

(54) BATTERY MODULE AND MANUFACTURING METHOD THEREOF

(71) Applicant: SK INNOVATION CO., LTD., Seoul (KR)

(72) Inventors: Kwan Yong Kim, Daejeon (KR); Kenneth Kim, Daejeon (KR); Yun Joo Noh, Daejeon (KR); Tae Gu Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 271 days.

(21) Appl. No.: 16/541,826

(22) Filed: Aug. 15, 2019

(65) Prior Publication Data

US 2020/0067040 A1   Feb. 27, 2020

(30) Foreign Application Priority Data

Aug. 21, 2018 (KR) ........................ 10-2018-0097131

(51) Int. Cl.
| | |
|---|---|
| *H01M 10/613* | (2014.01) |
| *H01M 10/6557* | (2014.01) |
| *H01M 50/258* | (2021.01) |
| *H01M 10/18* | (2006.01) |
| *H01M 50/289* | (2021.01) |
| *H01M 50/211* | (2021.01) |
| *H01M 50/507* | (2021.01) |
| *H01M 50/271* | (2021.01) |
| *H01M 50/569* | (2021.01) |
| *H01M 10/651* | (2014.01) |
| *H01M 10/625* | (2014.01) |
| *H01M 10/48* | (2006.01) |

(52) U.S. Cl.
CPC ....... *H01M 10/613* (2015.04); *H01M 10/482* (2013.01); *H01M 10/486* (2013.01); *H01M 10/6557* (2015.04); *H01M 50/211* (2021.01); *H01M 50/258* (2021.01); *H01M 50/271* (2021.01); *H01M 50/289* (2021.01); *H01M 50/507* (2021.01); *H01M 50/569* (2021.01); *H01M 10/625* (2015.04); *H01M 10/651* (2015.04)

(58) Field of Classification Search
CPC .. H01M 50/20; H01M 50/147; H01M 50/258; H01M 50/502; H01M 10/613; H01M 10/6557; H01M 10/651; H01M 10/625
See application file for complete search history.

(56) References Cited

U.S. PATENT DOCUMENTS

| | | | | |
|---|---|---|---|---|
| 2012/0129022 | A1* | 5/2012 | Kalish ................ | H01M 10/625 |
| | | | | 429/72 |
| 2013/0004822 | A1* | 1/2013 | Hashimoto ....... | H01M 10/6556 |
| | | | | 429/120 |
| 2014/0234691 | A1* | 8/2014 | Lee ....................... | H01M 10/61 |
| | | | | 429/120 |
| 2014/0370339 | A1* | 12/2014 | Kim ..................... | H01M 50/50 |
| | | | | 429/72 |
| 2015/0037616 | A1* | 2/2015 | Wyatt ................. | H01M 10/625 |
| | | | | 429/153 |
| 2016/0240835 | A1* | 8/2016 | Sakurai .............. | H01M 10/625 |
| 2016/0329538 | A1* | 11/2016 | Hughes ............... | H01M 50/242 |
| 2017/0069887 | A1* | 3/2017 | Lee .................... | H01M 10/655 |
| 2017/0237050 | A1* | 8/2017 | Joerg ................. | H01M 10/625 |
| | | | | 429/99 |
| 2017/0256833 | A1* | 9/2017 | Ciaccio ............. | H01M 10/6556 |
| 2018/0183117 | A1* | 6/2018 | Cho ................... | H01M 10/653 |
| 2019/0173064 | A1* | 6/2019 | Lee ................... | H01M 10/6567 |
| 2021/0143508 | A1* | 5/2021 | Yoshida ............. | H01M 10/625 |

FOREIGN PATENT DOCUMENTS

| | | |
|---|---|---|
| CN | 102856516 A | 1/2013 |
| CN | 204103003 U | 1/2015 |
| CN | 104471743 A | 3/2015 |
| CN | 105895982 A | 8/2016 |
| CN | 205828455 U | 12/2016 |
| JP | 2015-088236 A | 5/2015 |
| JP | 2018-521447 A | 8/2018 |
| KR | 10-2007-0096148 A | 10/2007 |
| KR | 10-1560217 | 10/2015 |
| KR | 10-2017-0053429 A | 5/2017 |

OTHER PUBLICATIONS

Machine translation of JP2015-088236, published on May 7, 2015 (Year: 2015).*
Office Action for Chinese Patent Application No. 201910762281.7 issued by the Chinese Patent Office dated Sep. 1, 2022.
Office Action for the Korean Patent Application No. 10-2018-0097131 issued by the Korean Intellectual Property Office dated Jul. 24, 2023.

* cited by examiner

*Primary Examiner* — Anca Eoff
(74) *Attorney, Agent, or Firm* — IP & T GROUP LLP

(57) ABSTRACT

The present invention provides a battery module including: a battery group including a plurality of battery cells stacked with each other; a cooling plate which is located in contact with one side of the battery group to cool the plurality of battery cells; and a case which is located on the other side of the battery group so as to surround the battery group, wherein the case comprises an upper cover located on the other side of the battery group; and side covers which vertically extend from the upper cover so as to surround side portions of the plurality of battery cells from which electrode tabs protrude.

9 Claims, 9 Drawing Sheets

111a 111b
111

112(112')

BATTERY MODULE AND MANUFACTURING METHOD THEREOF

CROSS-REFERENCE TO RELATED APPLICATION

This application claims priority to Korean Patent Applications No. 10-2018-0097131 filed on Aug. 21, 2018 in the Korean Intellectual Property Office (KIPO), the entire disclosure of which is incorporated by reference herein.

BACKGROUND OF THE INVENTION

1. Field of the Invention

The present invention relates to a battery module and a manufacturing method thereof.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

As described above, when the plurality of secondary batteries are connected with each other in series to be used in a high-output hybrid vehicle or an electric vehicle, the plurality of secondary batteries are fixed using a member such as a cover or a case, then a plurality of battery cells are electrically connected with each other using a connection member such as a bus bar. Therefore, the plurality of secondary batteries may be used as one battery module form.

However, in the case of the conventional battery module, a separate fixing member for stacking and fixing the plurality of battery cells, and separate cooling members such as cooling fins and a cooling plate for cooling the battery cells are further required, such that a volume of the battery module is increased. In addition, since the respective side faces of a module case are separately provided and then coupled to each other, there is a problem that the module manufacturing process is complicated and manufacturing time and costs are increased.

Korean Patent Registration No. 10-1560217 (registered on Oct. 7, 2015) discloses a battery case including an electrode assembly which includes a cathode, an anode, and a separation membrane, battery cells from which electrode tabs protrude to an outside, and a cooling member attached to at least one surface of the stacked battery cells, however, it did not solve the above problems.

SUMMARY OF THE INVENTION

It is an object of embodiments of the present invention to provide a battery module capable of minimizing a volume and maximizing an energy density by maximizing space utilization, and a manufacturing method thereof.

In addition, another object of embodiments of the present invention is to provide a battery module having enhanced strength and rigidity to improve assembly performance, and a manufacturing method thereof.

Further, another object of embodiments of the present invention is to provide a battery module in which one side of a case is opened to facilitate application of a thermal conductive member during manufacturing and insertion of a battery group, and a manufacturing method thereof.

Further, another object of embodiments of the present invention is to provide a battery module which may minimize an applying amount of a thermal conductive member between a battery group and a cooling plate, and a manufacturing method thereof.

Further, another object of embodiments of the present invention is to provide a battery module in which surface contact between a battery group and a cooling plate is maximized by an elastic pad provided on an upper side of the battery group, and a manufacturing method thereof.

Further, another object of embodiments of the present invention is to provide a battery module in which a thermal conductive member is thinly spread between a battery group and a cooling plate to increase a contact area therebetween, and thereby maximizing a cooling efficiency of battery cells by a cooling plate, and a manufacturing method thereof.

Further, another object of embodiments of the present invention is to provide a battery module in which a case is formed by at least one of extrusion, pressing and bending processes in a direction ('stacking direction') in which battery cells are stacked, such that a length of the case may be freely increased regardless of the number of stacked battery cells, and a manufacturing method thereof.

Further, another object of embodiments of the present invention is to provide a battery module in which a barrier is disposed between a predetermined number of stacked battery cells to increase a structural rigidity, and a manufacturing method thereof.

Further, another object of embodiments of the present invention is to provide a battery module in which a surface pressure pad may be sandwiched for each at least one battery cell to prevent module structure from being broken due to swelling, and a manufacturing method thereof.

Further, another object of embodiments of the present invention is to provide a battery module in which a flame retardant pad may be sandwiched for each at least one battery cell to prevent flame spread, and the like in time of emergency, and a manufacturing method thereof.

Furthermore, another object of embodiments of the present invention is to provide a battery module in which a sensing unit for measuring a temperature of battery cells is integrally provided in a bus bar assembly, thereby the sensing unit can be fixed at a desired measurement position of battery cells by simply fastening the bus bar assembly and a plurality of battery cells with each other, and a manufacturing method thereof.

In order to achieve the above objects, according to an aspect of the present invention, there is provided a battery module including: a battery group including a plurality of battery cells stacked on each other; a cooling plate which is located in contact with one side of the battery group to cool the plurality of battery cells; and a case which is located on the other side of the battery group so as to surround the battery group, wherein the case includes an upper cover located on the other side of the battery group; and side covers which vertically extend from the upper cover so as to surround side portions of the plurality of battery cells from which electrode tabs protrude.

The case may be formed as an integrated structure having a length corresponding to a length in a direction in which the plurality of battery cells of the battery group are stacked.

The battery group may include barriers which are disposed between subgroups in which a predetermined number of the battery cells are stacked, and have a predetermined rigidity.

The battery group may include at least one of a surface pressure pad and a flame retardant pad, which are sandwiched between one or more battery cells.

At least one of the surface pressure pad and the flame retardant pad may be sandwiched between at least two bundles of the battery cells, and battery cells, which do not include at least one of the surface pressure pad and the flame retardant pad sandwiched between the battery cells facing each other among the plurality of battery cells, may be bonded to each other.

A thermal conductive member may be located between the battery group and the cooling plate to increase a contact area between the battery group and the cooling plate.

The case may include an elastic pad disposed on one side of the upper cover to press the battery group to the cooling plate side.

The battery module may further include a bus bar assembly configured to electrically connect the plurality of battery cells, wherein the bus bar assembly includes: at least one bus bar which is connected to the electrode tabs of adjacent battery cells among the plurality of battery cells to electrically connect the adjacent battery cells with each other; a bus bar frame which is formed so as to surround the at least one bus bar to fix and support the at least one bus bar; and a sensing unit which comes into contact with at least a portion of the plurality of battery cells to measure a temperature of the battery cells.

The sensing unit may include a first sensing member which is located in contact with a side face of the battery cell from which the electrode tab protrudes to measure a temperature of the battery cells on the electrode tab side.

The first sensing member may be in close contact with the battery cell by a support member formed on at least a portion of the bus bar frame.

The sensing unit may include a second sensing member which is located in contact with an upper surface of the battery cell to measure a temperature of an upper side of the battery cell.

In addition, according to another aspect of the present invention, there is provided a battery module including: a battery group including a plurality of battery cells stacked on each other; a cooling plate which is located in contact with one side of the battery group to cool the plurality of battery cells; and a case which is located on the other side of the battery group so as to surround the battery group, wherein the case includes an upper cover located on the other side of the battery group; and side covers which vertically extend from the upper cover to the cooling plate side, and the side covers are formed in a direction in which the plurality of battery cells are stacked.

Further, according to another aspect of the present invention, there is provided a method of manufacturing a battery module including: stacking a plurality of battery cells on each other, placing the stacked battery cells on one side of a cooling plate, and coupling a case, which includes an upper cover which covers the other side of the stacked battery cells and side covers which vertically extend from the upper cover so as to surround side portions of the plurality of stacked battery cells from which electrode tabs protrude, with the cooling plate.

The case may be formed by at least one of extrusion, pressing and bending processes.

The case may be formed to have a length corresponding to a length in a direction in which the plurality of battery cells are stacked.

During stacking the plurality of battery cells, a barrier having a predetermined rigidity may be disposed between a predetermined number of the plurality of stacked battery cells.

During placing the plurality of stacked battery cells on the cooling plate, a thermal conductive member may be applied to at least one of the cooling plate and the plurality of battery cells.

During coupling the case with the cooling plate, the plurality of battery cells may be pressed to the cooling plate side by an elastic pad disposed on one side of the upper cover, such that the thermal conductive member is applied in a form of a thin film.

Before coupling the case with the cooling plate, a bus bar assembly may be connected to the electrode tabs of the plurality of battery cells.

The bus bar assembly may include a sensing unit which comes into contact with at least a portion of the plurality of battery cells to measure a temperature of the battery cells, wherein, during connecting the bus bar assembly with the electrode tab, a first sensing member of the sensing unit may come into close contact with a side face of the battery cell from which electrode tabs protrude by a support member protruding from the bus bar assembly.

The bus bar assembly may include a sensing unit which comes into contact with at least a portion of the plurality of battery cells to measure a temperature of the battery cells, wherein, during connecting the bus bar assembly with the electrode tab, a second sensing member of the sensing unit may come into close contact with an upper portion of the battery cell by an elastic pad disposed on one side of the upper cover.

According to embodiments of the present invention, it is possible to minimize a volume and maximize an energy density by maximizing space utilization.

In addition, according to the embodiments of the present invention, the strength and rigidity may be enhanced to improve the assembly performance.

Further, according to the embodiments of the present invention, one side of the case is opened, such that the thermal conductive member may easily applied and the battery group may easily be inserted.

Further, according to the embodiments of the present invention, the applying amount of the heat conduction member between the battery group and the cooling plate may be minimized.

Further, according to the embodiments of the present invention, the surface contact between the battery group and the cooling plate may be maximized by the elastic pad provided on an upper side of the battery group.

Further, according to the embodiments of the present invention, the thermal conductive member may be thinly spread between the battery group and the cooling plate to increase the contact area therebetween, and thereby maximizing a cooling efficiency of the battery cells by the cooling plate.

Further, according to the embodiments of the present invention, since the case may be formed by at least one of extrusion, pressing and bending processes in the stacking direction of battery cells, such that a length of the case may be freely increased regardless of the number of stacked battery cells.

Further, according to the embodiments of the present invention, the barrier may be disposed between a predetermined number of stacked battery cells to increase the structural rigidity.

Further, according to the embodiments of the present invention, the surface pressure pad may be sandwiched for each at least one battery cell to prevent a module structure from being broken due to swelling.

Further, according to the embodiments of the present invention, the flame retardant pad may be sandwiched for each at least one battery cell to prevent flame spread, and the like in time of emergency.

Furthermore, according to the embodiments of the present invention, the sensing unit for measuring a temperature of the battery cell may be integrally provided in the bus bar assembly, thereby the sensing unit can be fixed at the desired measurement position of battery cells by simply fastening the bus bar assembly and the plurality of battery cells with each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
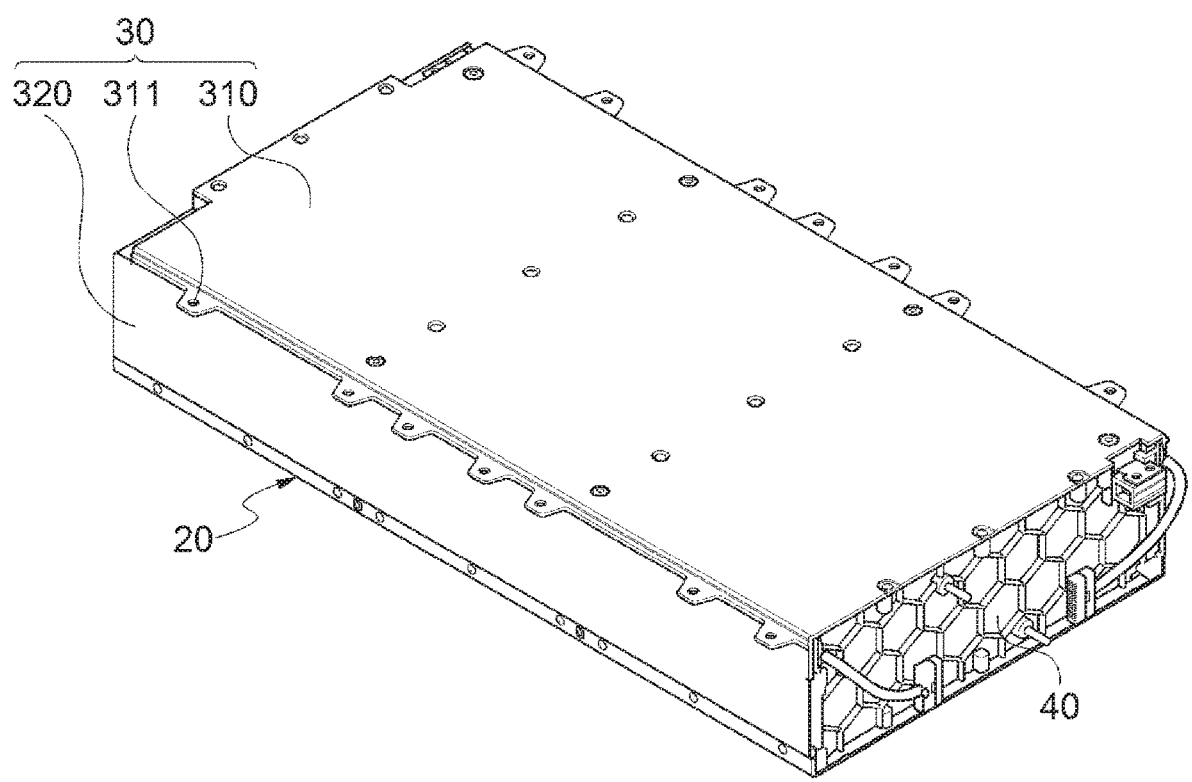
FIG. 1 is a perspective view illustrating a battery module according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Figure 2:
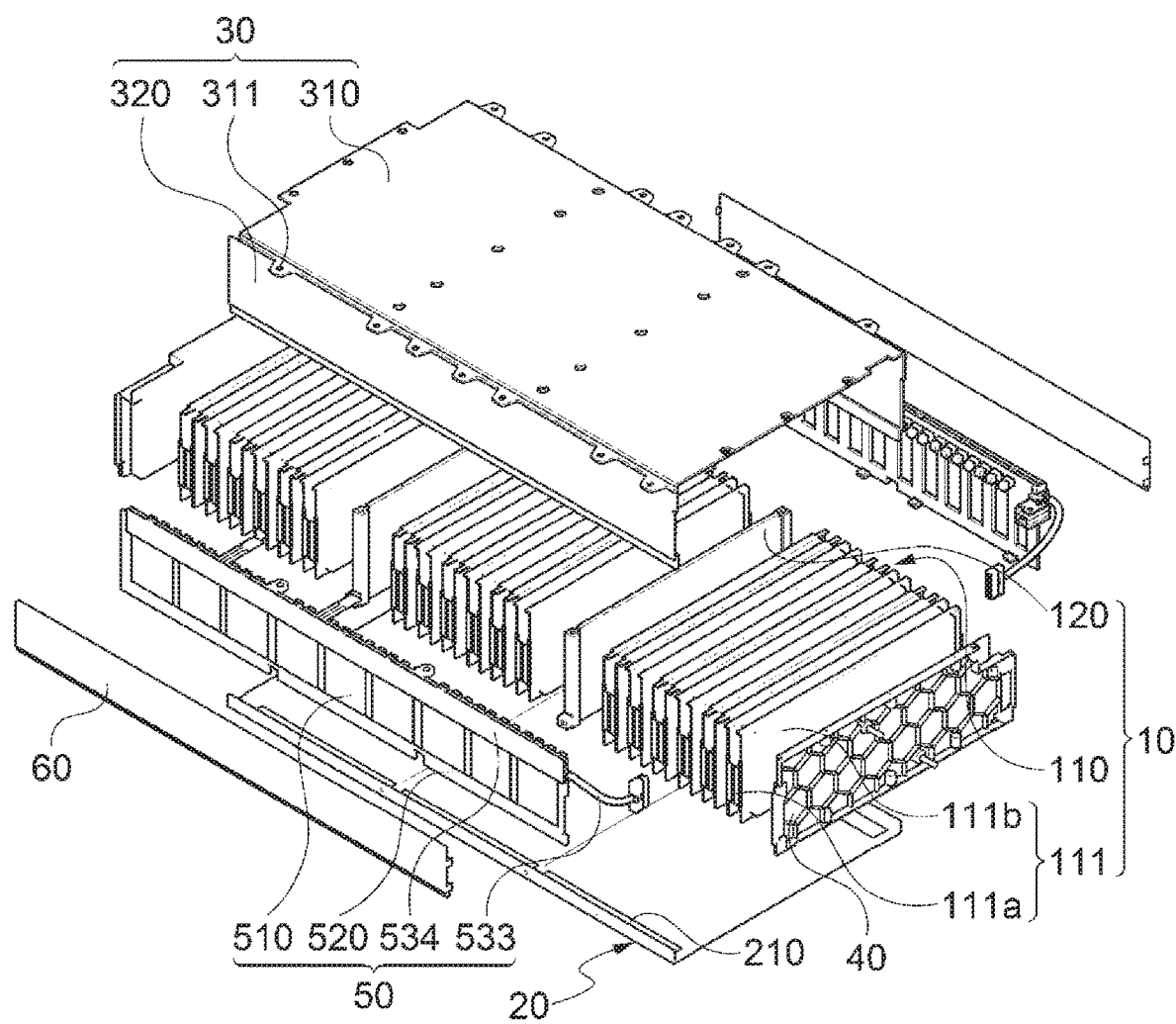
FIG. 2 is an exploded perspective view illustrating the battery module according to the embodiment of the present invention.

FIG. 1 is a perspective view illustrating a battery module 1 according to an embodiment of the present invention, and FIG. 2 is an exploded perspective view illustrating the battery module 1 according to the embodiment of the present invention.

Referring to FIGS. 1 and 2, the battery module 1 according to the embodiment of the present invention includes a battery group 10 including a plurality of battery cells 111 stacked on each other, a cooling plate 20 which comes into contact with one side of the battery group 10 to cool the plurality of battery cells 111, and a case 30 which is located so as to surround the battery group 10 on a side opposite to the cooling plate 20. At this time, the case 30 may include an upper cover 310 located on the other side of the battery group 10, and side covers 320 vertically extend from the upper cover 310 so as to surround side portions of the plurality of battery cells 111 from which the electrode tabs 111a protrude.

Specifically, the plurality of battery cells 111 stacked on each other may be located with being placed on the cooling plate 20 on a lower side in the drawings. As the case 30 on an upper side of the battery group 10 is combined with the cooling plate 20, it is possible to protect the upper portion and the side portions of the battery group 10 from foreign materials and the like.

The side portion of the battery group 10 as used herein may mean the side portions of the plurality of battery cells 111 from which the electrode tabs 111a protrude. That is, the side covers 320 of the case 30 may be formed and located in a direction in which the plurality of battery cells 111 are stacked (illustrated in FIG. 8).

Meanwhile, the case 30 may be formed to have a length corresponding to a length in a direction d1 in which the plurality of battery cells 111 of the battery group 10 are stacked. ('stacking direction d1'), and the side covers 320 may vertically extend from both ends of the upper cover 310 to the cooling plate 20 side, so as to be formed as an integral structure.

For example, the case 30 may be formed by extruding in the same direction as the direction d1 in which the plurality of battery cells 111 are stacked on each other, such that even if the number of the battery cells 111 stacked on the battery group 10 changes, the length of the case 30 may be freely increased or decreased corresponding to the length in the stacking direction d1 of the plurality of stacked battery cells 111, which will be described in detail below.

Meanwhile, the case 30 may further include module fastening parts 311 which are integrally formed with the upper cover 310 or the side covers 320 by protruding from at least a portion of an outer surface thereof. Due to the module fastening parts 311, it is possible to increase a coupling force of the battery modules 1 through coupling with other battery modules when manufacturing a secondary battery pack including the plurality of battery modules 1, and enhance a structural rigidity of the secondary battery pack.

In addition, the battery group 10 of the battery module 1 according to the embodiment of the present invention may include barriers 120 disposed between subgroups 110 in which a predetermined number of battery cells 111 are stacked.

Specifically, each predetermined number of battery cells 111 among the plurality of battery cells 111 forming the battery group 10 may form the subgroup 110, and one or more subgroups 110 may be provided to form the battery group 10. In this case, the barrier 120 may be formed so as to have a predetermined rigidity, and the barriers 120 may be disposed between the subgroups 110 to prevent the plurality of battery cells 111 in the battery group 10 from being expanded in the stacking direction d1, and thereby the structural rigidity of the battery module 1 may be maintained.

Further, front and rear covers 40 may be disposed at both ends of the battery group 10 in the direction d1 in which the plurality of battery cells 111 are stacked, and the front and rear covers 40 having a predetermined rigidity are combined with the cooling plate 20 and the case 30, such that it is possible to prevent the plurality of battery cells 111 from being expanded in the stacking direction d1, and maintain the structural rigidity of the battery module 1.

Meanwhile, the battery module I according to the embodiment of the present invention may include a bus bar assembly 50 that electrically connects the plurality of battery cells 111. In addition, mounting grooves 210 may be formed in at least a portion of both end portions of the cooling plate 20 on the electrode taps 111a side of the battery cell 111 so that the bus bar assembly 50 may be mounted.

At this time, the mounting groove 210 may be formed by pressing at least a portion of the end of the cooling plate 20 in a predetermined depth, and preferably, is formed in a shape corresponding to a lower end shape of the bus bar assembly 50.

As described above, the bus bar assembly 50 is located with being mounted in the mounting groove 210 formed in the cooling plate 20 on the battery group 10 side. Therefore, the fastening strength between the bus bar assembly 50, the battery group 10, and the cooling plate 20 may be enhanced, and problems such as disconnection of the bus bar assembly 50 and the battery group 10 due to an external impact or the like may be prevented.

In addition, a bus bar cover 60 may be disposed between the side cover 320 and the bus bar assembly 50 to block the possibility of electrical communication between the bus bar assembly 50 and the side cover 320. The bus bar cover 60 and the bus bar assembly 50 will be described in more detail below.

Further, a thermal conductive member (not illustrated) such as a gap filler or a thermal conductive adhesive may be located between the battery group 10 and the cooling plate 20 in a thin film form, in order to increase a degree of contact between the battery group 10 and the cooling plate 20.

Specifically, the thermal conductive member having a thermal conductivity may be located between the battery group 10 and the cooling plate 20 in a thinly spread state, and a contact area between the battery group 10 and the cooling plate 20 is maximized to minimize a gap between the battery group 10 and the cooling plate 20. Therefore, a heat transfer efficiency of the battery group 10 by the cooling plate 20 may be increased.

Further, the thermal conductive member may be made of a material having insulation property, thereby blocking the possibility of electrical communication between the plurality of battery cells 111 and the cooling plate 20. Meanwhile, the thermal conductive member is not limited to an adhesive, or the like, and a double-sided tape having thermal conductivity may be applied.

Figure 3:
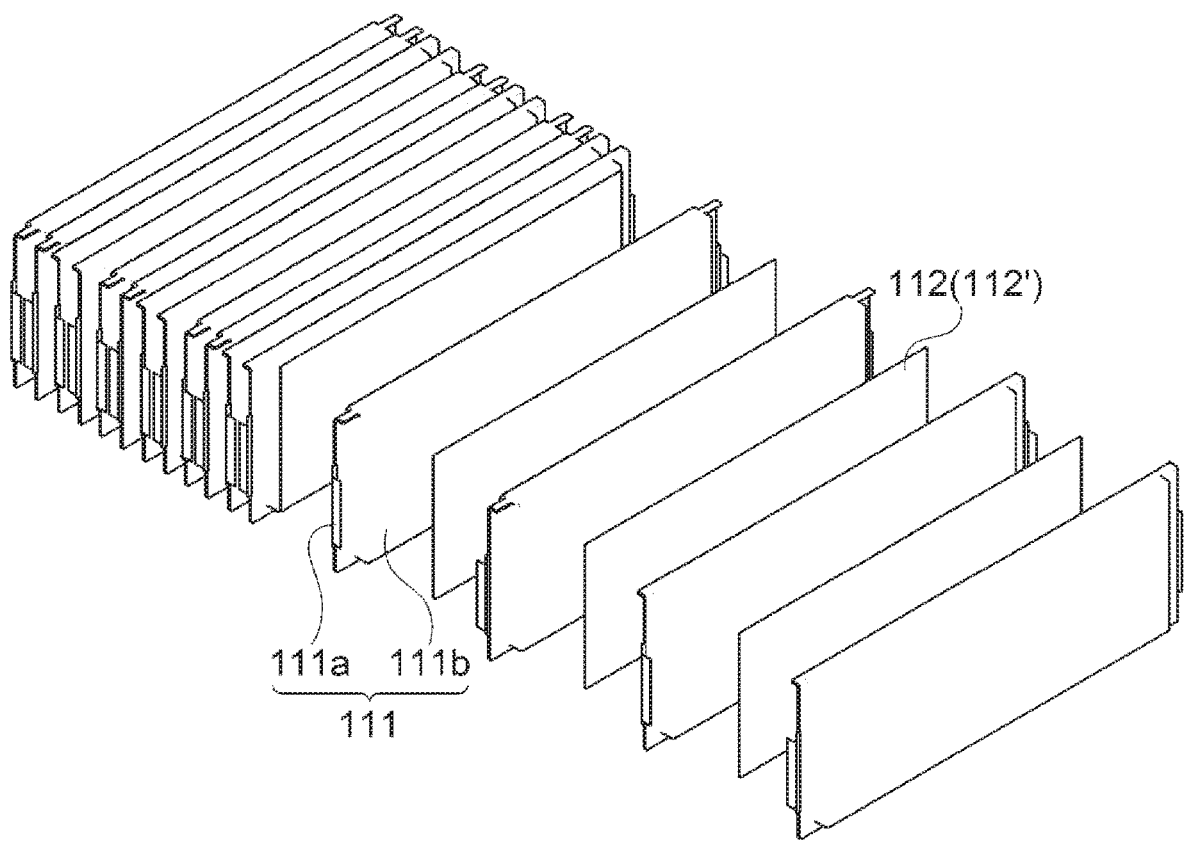
FIG. 3 is a partially exploded perspective view illustrating a subgroup of the battery module according to the embodiment of the present invention.
Figure 4A:
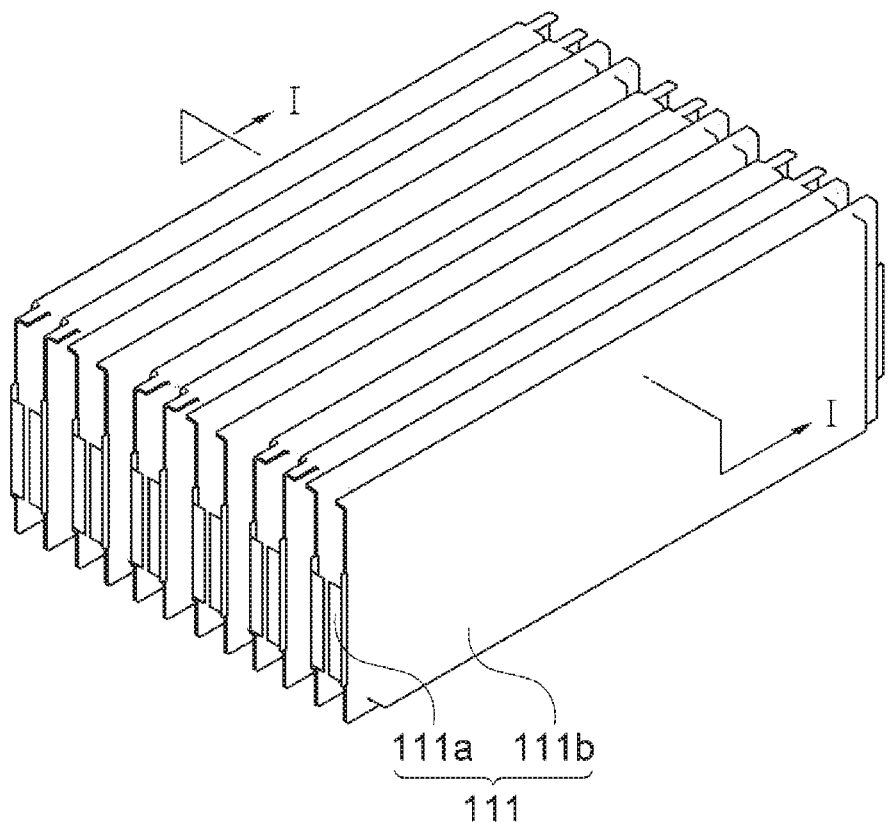
FIG. 4A is a perspective view illustrating the subgroup of the battery module according to the embodiment of the present invention.
Figure 4B:
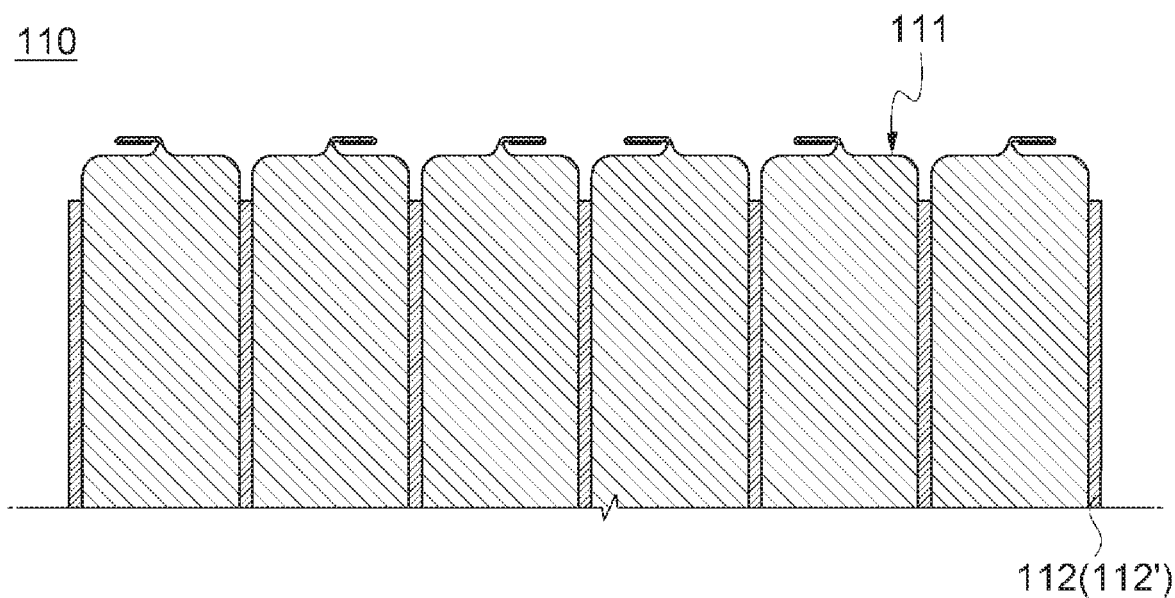
FIG. 4B is a cross-sectional view taken on line I-I of the subgroup illustrated in FIG. 4A.

FIG. 3 is a partially exploded perspective view illustrating the subgroup 110 of the battery module 1 according to the embodiment of the present invention, FIG. 4A is a perspective view illustrating the subgroup 110 of the battery module 1 according to the embodiment of the present invention, and FIG. 4B is a cross-sectional view taken on line I-I of the subgroup 110 illustrated in FIG. 4A.

Referring to FIGS. 3 and 4, the battery group 10 may include a surface pressure pad 112 sandwiched between one or more battery cells 111. Specifically, the surface pressure pad 112 may be disposed for each bundle of a predetermined number of adjacent battery cells 111 among the plurality of battery cells 111. In addition, the surface pressure pad 112 may have its own adhesive force and may be adhered to the battery cells 111 on both sides of the surface pressure pad 112. In this case, the surface pressure pad 112 is made of an elastic material and has a constant surface-pressure stress, and may play a role of supporting the battery cells 111 by an allowable thickness thereof when the battery cells 111 are swelled.

As described above, since the surface pressure pad 112 is disposed between the plurality of battery cells 111, it is possible to reduce expanding of the plurality of battery cells 111 of the battery group 10 due to swelling, and prevent external impact, vibration, and the like from being transmitted to the battery cells 111.

Meanwhile, preferably, the surface pressure pads 112 are sandwiched between two bundles of battery cells 111 adjacent to each other, or between two or more bundles of adjacent battery cells 111. Further, among the adjacent battery cells 111 facing each other, the battery cells 111, in which the surface pressure pad 112 is not sandwiched therebetween, may be adhered to each other by a double-sided tape or an adhesive member such as an adhesive. Thereby, the energy density of the entire battery module 1 may be improved.

However, the surface pressure pad 112 is not limited to the case of being disposed between the battery cells 111 as illustrated in the drawings, and may be disposed between two bundles or three bundles of the battery cells 111 disposed adjacent to each other by selecting the number of bundles, as necessary.

Further, the surface pressure pad 112 may be formed as a flame retardant pad 112' having flame retardance. Specifically, the flame retardant pad 112' may be disposed in addition to the surface pressure pad 112 between one or more of the plurality of battery cells 111 of the battery group 10, and the flame retardant pad 112' may be made of a retardant material that does not burn. Thereby, it is possible to prevent a fire from being transferred or expanded to the peripheral battery cells 111 even in the event of the fire or an explosion due to overheating.

At this time, the flame retardant pad 112' may be made of a material such as silicon and ceramic, etc., but this is merely an example, and it is not limited thereto. Of course, any material so long as it is a flame retardant material may be sufficiently used. In addition, it is not limited to the case in which any one of the surface pressure pad 112 and the flame retardant pad 112' is sandwiched between the battery cells 111, and the surface pressure pad 112 and the flame retardant pad 112' may be disposed together for each at least one battery cell 111, or the surface pressure pad 112 and the flame retardant pad 112' may be disposed while being overlapped with each other, for example, by selecting the arrangement thereof, as necessary.

Figure 5:
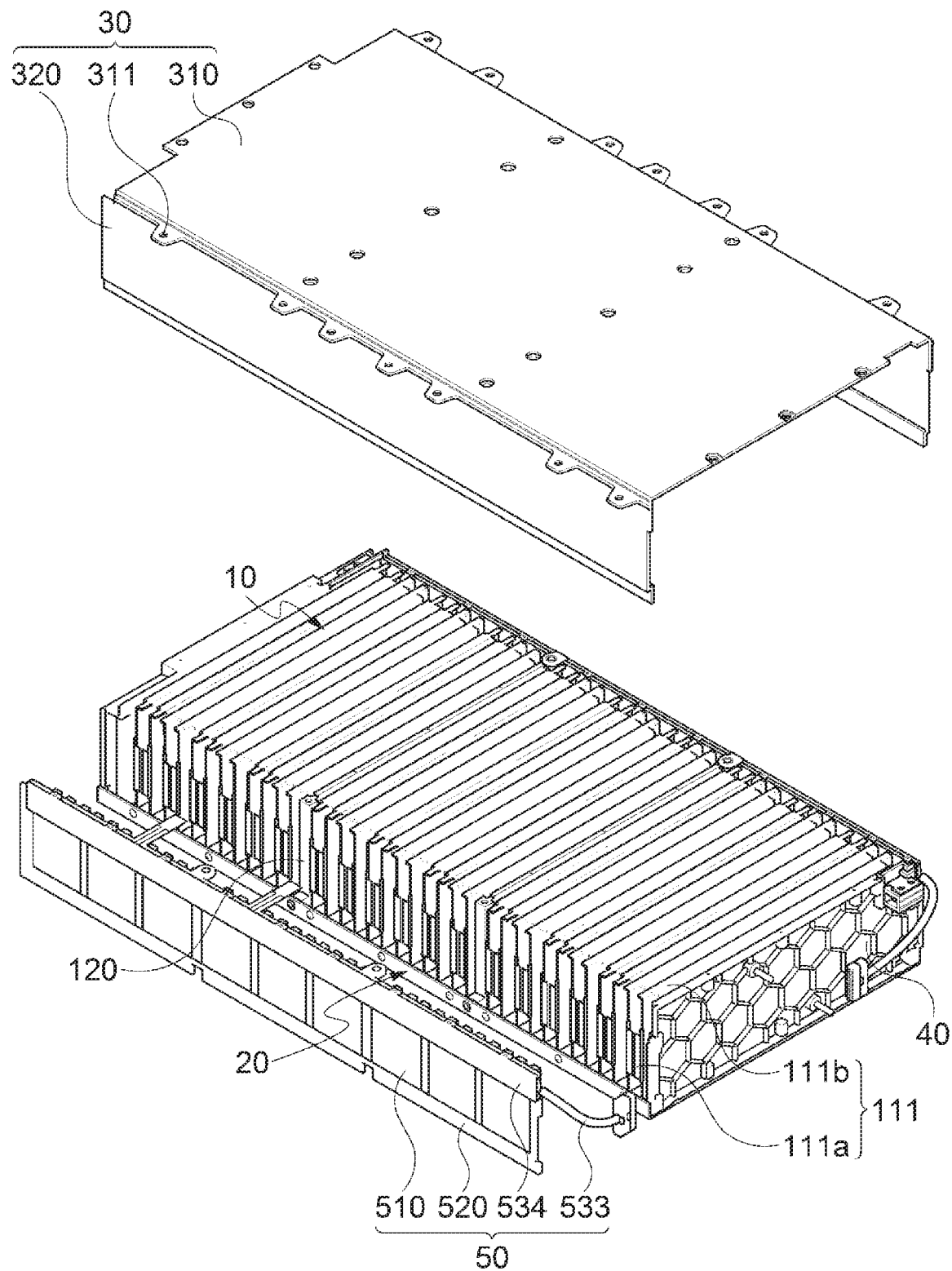
FIG. 5 is an exploded perspective view illustrating a state in which a bus bar assembly and a case are mounted in a battery group of the battery module according to the embodiment of the present invention.
Figure 6:
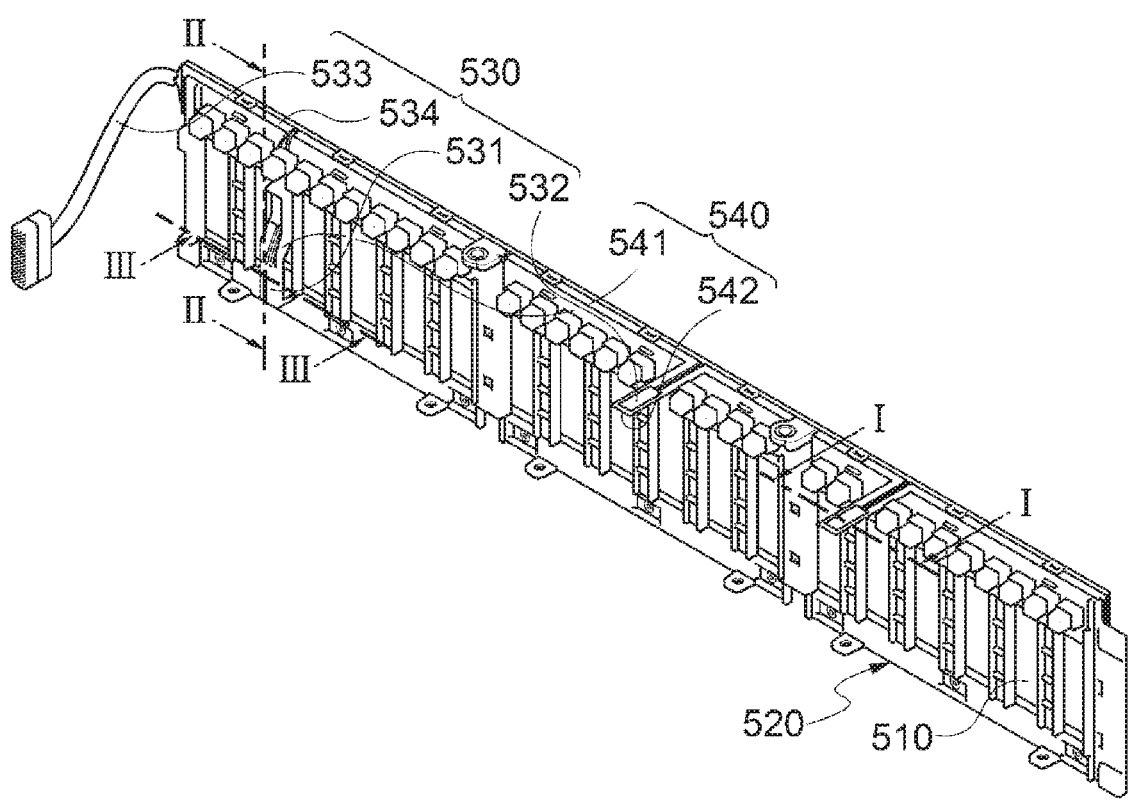
FIG. 6 is a perspective view illustrating the bus bar assembly of the battery module according to the embodiment of the present invention.

FIG. 5 is an exploded perspective view illustrating a state in which the bus bar assembly 50 and the case 30 are mounted in the battery group 10 of the battery module 1 according to the embodiment of the present invention, and FIG. 6 is a perspective view illustrating the bus bar assembly 50 of the battery module 1 according to the embodiment of the present invention. At this time, the bus bar assembly 50 illustrated in FIG. 6 shows an inner perspective view of the bus bar assembly 50 illustrated in FIG. 5, wherein a left end of the front bus bar assembly 50 of FIG. 5 corresponds to a right end of the bus bar assembly 50 of FIG. 6 in the drawings, and the right end of the front bus bar assembly 50 of FIG. 5 corresponds to the left end of the bus bar assembly 50 of FIG. 6 in the drawings.

Referring to FIGS. 5 and 6, the battery module 1 according to the embodiment of the present invention may include the bus bar assembly 50 that electrically connects the plurality of battery cells 111 to each other.

The bus bar assembly 50 may include at least one bus bar 510 which is connected to the electrode tabs 111a of adjacent battery cells 111 among the plurality of battery cells 111 to electrically connect the adjacent battery cells 111 with each other, and a bus bar frame 520 which is formed so as to surround the at least one bus bar 510, and is configured to fix and support the at least one bus bar 510 in position.

Specifically, each of one or more bus bars 510 may be coupled to the electrode tabs 111a of the adjacent battery cell 111 by contacting, welding, or the like, thereby electrically connecting the adjacent battery cells 111 with each other. At this time, if one or more bus bars 510 come into contact with each other, a short circuit, or the like may occur inside the battery module 1. Therefore, the one or more bus bars 510 may be fixed and supported by the bus bar frame 520 made of an insulation material with being spaced apart from each other.

In addition, the bus bar assembly 50 may further include a sensing unit 530 which comes into contact with at least a portion of the plurality of battery cells 111 to measure a temperature of the battery cells 111, and a support unit 540 which supports the sensing unit 530.

At this time, the sensing unit 530 may protrude from the bus bar assembly 50 toward the plurality of battery cells 111 stacked on each other. Further, the sensing unit 530 may include a first sensing member 531 which is located in contact with a side face of the battery cell 111 from which the electrode tab 111a protrudes to measure the temperature of the battery cells 111 on the electrode tab 111a side, and a second sensing member 532 which is located in contact with an upper surface of the battery cells 111 to measure the temperature of an upper side of the sensor 111.

Specifically, the battery cell 111 may include a cell body 111b which houses an electrode assembly (not illustrated) and the electrode tabs 111a which protrude from one side of the cell body 111b. In this case, the first sensing member 531 may come into contact with a side face of the side cell body 111b from which the electrode tab 111a of the battery cell 111 protrudes to measure the temperature of a side portion of the battery cells 111 on the electrode tab 111a side, and the second sensing member 532 may come into contact with an upper surface of the cell body 111b of the battery cell 111 to measure the temperature of an upper portion of the battery cell 111.

However, the temperature measurement positions of the sensing unit 530 are merely an example, but it is not limited thereto, and the first sensing member 531 or the second sensing member 532 comes into contact with a lower surface of the battery cell 111 or a specific portion of the cell body 111b to measure the temperature of the battery cell 111.

Meanwhile, the support unit 540 may include a first support member 541 and a second support member 542.

Specifically, the first support member 541 may be formed in such a way that at least a portion of the bus bar frame 520 protrudes to the electrode tab 111a side of the battery cell 111, and preferably, protrudes between the adjacent bus bars 510 of the at least one bus bar 510 to the electrode tab 111a side, thus to fix and support the first sensing member 531 in position. In addition, the first support member 541 may be made of a material having a predetermined elastic repulsive force, such that the first sensing member 531 may come into close contact with at least a portion of the battery cell 111 when fastening the bus bar assembly 50 to the battery group 10.

Further, the second sensing member 532 may be formed in such a way that at least a portion of the bus bar frame 520 protrudes to the electrode tab 111a side, and preferably, at least a portion of the upper side of the bus bar frame 520 protrudes to the electrode tab 111a side, thus to fix and support the second sensing member 532 in position. At this time, the second sensing member 532 may also have a predetermined elasticity, such that the second sensing member 532 may come into close contact with the cell body 111b side when assembling the upper cover 310 on the upper side.

As described above, the first support member 541 and the second support member 542 fix and support the first sensing member 531 and the second sensing member 532, respectively. Therefore, the first sensing member 531 and the second sensing member 532 may be integrally provided together with the bus bar frame 520 and the at least one bus bar 510. Alternately, by simply fastening the bus bar assembly 50 to the battery group 10, the first sensing member 531 and the second sensing member 532 may be located at any desired position in the plurality of battery ceils 111.

Meanwhile, the sensing unit 530 may include a connector 533 which is connected to the first sensing member 531 and the second sensing member 532 to transmit temperature information of the battery cell 111 measured by the first sensing member 531 and the second sensing member 532 to an external BMS module (not illustrated), or the like, which is a printed circuit board to which the connector 533 is connected.

In addition, at least a portion of the connector 533 may be connected to the at least one bus bar 510 to transmit voltage information of each of one or more bus bars 510 to the external BMS module or the like.

At this time, the connector 533 may be formed in a form such as a cable, and may be provided integrally with the bus bar assembly 50. Meanwhile, the sensing unit 530 may further include a cover member 534 which is attached to at least a portion of an outer surface of the bus bar assembly 50 so as to surround the connector 533.

Furthermore, the bus bar cover 60 may be located outside of the bus bar assembly 50, and the bus bar cover 60 may be made of an insulation material to prevent the possibility of electrical communication between the at least one bus bar 510 and the side cover 320 of the case 30.

Figure 7A:
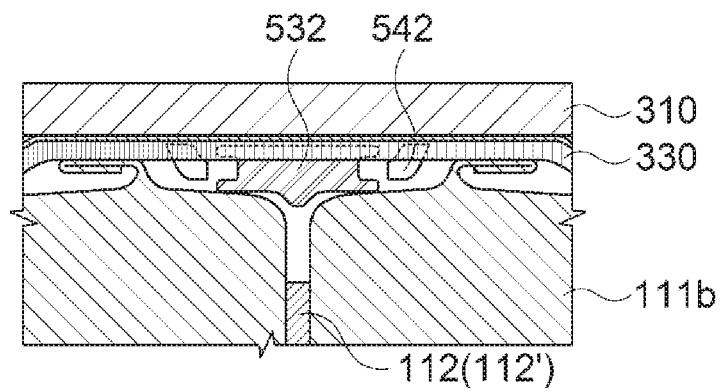
FIG. 7A is a partial cross-sectional view taken on line I-I of FIG. 6.
Figure 7B:
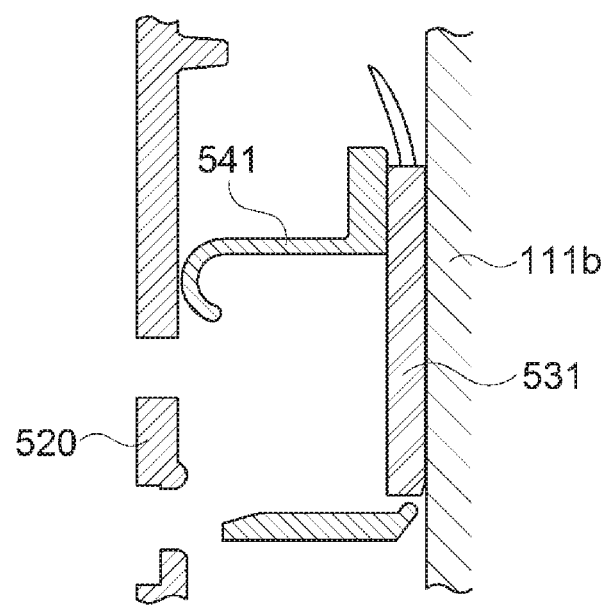
FIG. 7B is a partial cross-sectional view taken on line II-II of FIG. 6.
Figure 7C:
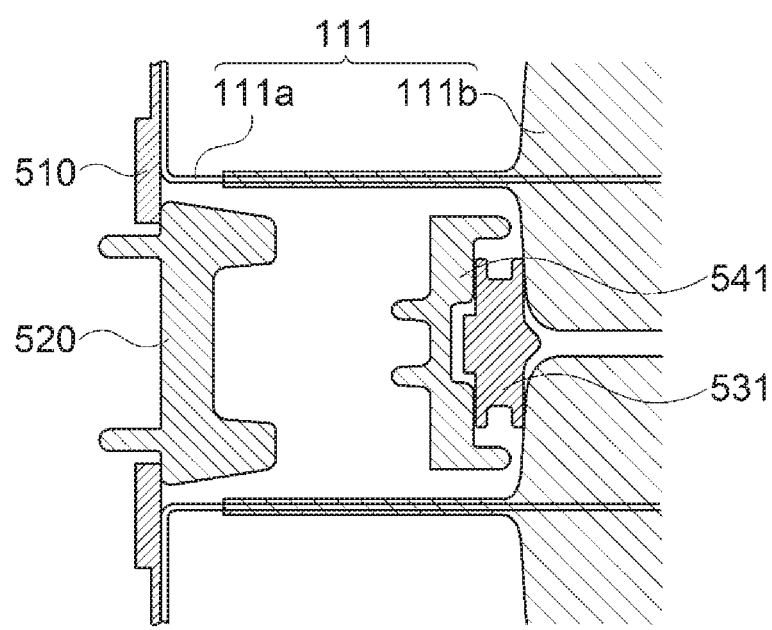
FIG. 7C is a partial cross-sectional view taken on line III-III of FIG. 6.

FIG. 7A is a partial cross-sectional view taken on line I-I of FIG. 6, FIG. 7B is a partial cross-sectional view taken on line II-II of FIG. 6, and FIG. 7C is a partial cross-sectional view taken on line III-III of FIG. 6.

In this case, the enlarged views illustrated in FIG. 7 show partially enlarged views of a state in which the battery group 10, the bus bar assembly 50, and the case 30 are coupled to each other. For the clear illustration in the drawing and the convenience of description in this disclosure, the respective enlarged positions are indicated by lines I-I, II-II and III-III in the bus bar assembly 50 of FIG. 6. In addition, as described above, the bus bar assembly 50 of FIG. 6 shows the state in which the bus bar assembly 50 of FIG. 5 is viewed from the battery group 10 side.

Referring to FIG. 7A, the case 30 may further include an elastic pad 330 which is disposed on one side of the upper cover 310 to press the battery group 10 to the cooling plate 20 side. Specifically, the elastic pad 330 has a compression repulsive force, and presses the battery group 10 at the upper side thereof so as to make the battery module 10 come into close contact to the cooling plate 20 which is disposed at the lower portion thereof. Therefore, the surface contact between the battery group 10 and the cooling plate 20 may be maximized, and the cooling efficiency of the battery cell 111 by the cooling plate 20 may be increased.

In addition, as the elastic pad 330 presses the second sensing member 532 on the upper side of the battery cell 111, the second sensing member 532 on the upper side of the battery cell 111 may more effectively come into close contact with the upper side of the cell body 111b.

Referring to FIGS. 7B and 7C, as described above, at least a portion of the electrode tab 111a of the battery cell 111 may be bent and located with being into surface contact with the bus bar 510. In addition, the first support member 541 may be located between the battery cell 111 and the bus bar frame 520 to make the first sensing member 531 come into close contact with the side portion of the battery cell 111 from which the electrode tab 111a protrudes.

Figure 8:
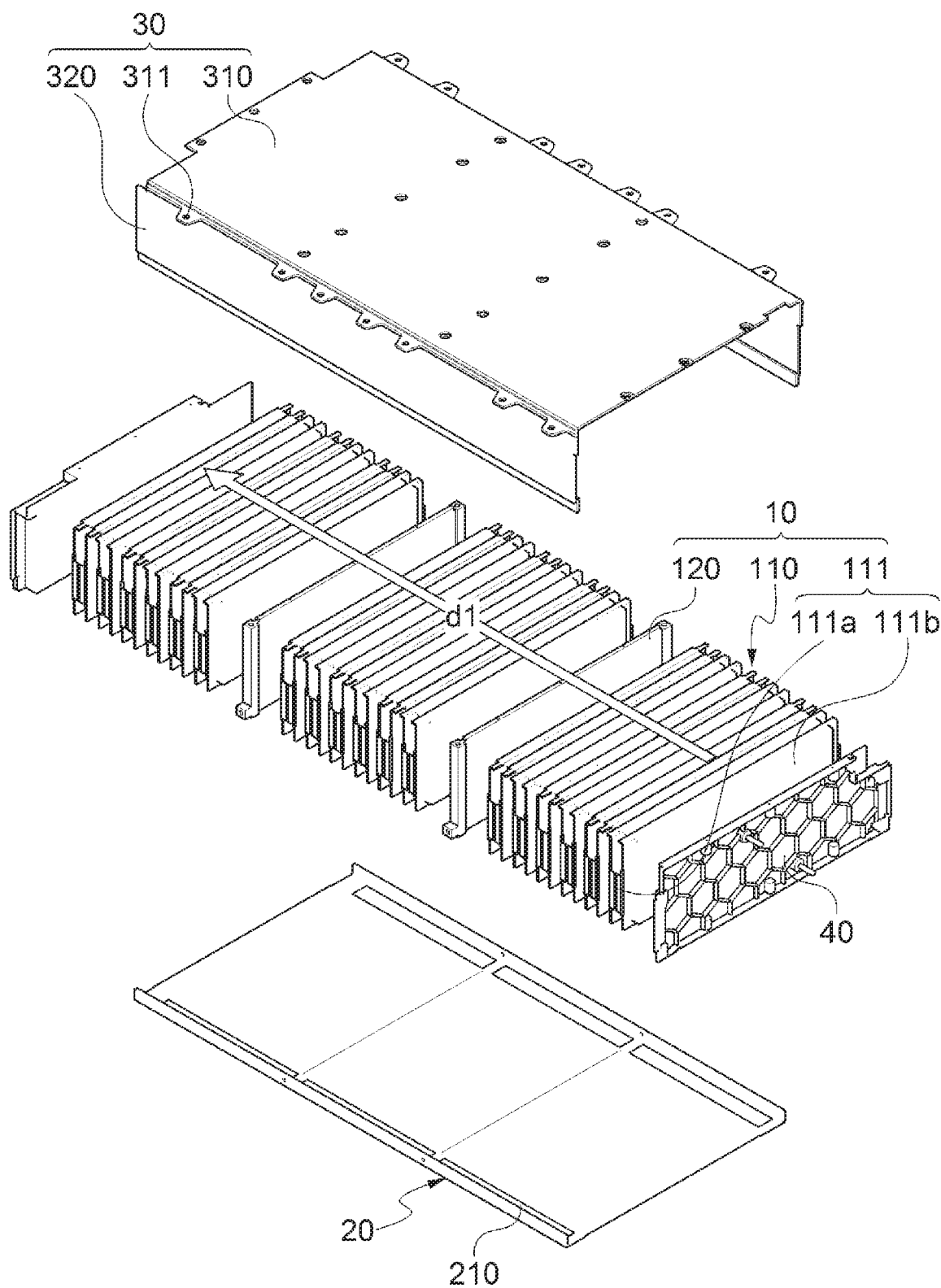
FIG. 8 is an exploded perspective view illustrating a battery group, a cooling plate, and the case of the battery module according to the embodiment of the present invention.

FIG. 8 is an exploded perspective view illustrating the battery group 10, the cooling plate 20, and the case 30 of the battery module 1 according to the embodiment of the present invention.

Referring to FIG. 8, the battery module 1 according to the embodiment of the present invention may be manufactured by stacking the plurality of battery cells 111 on each other, placing the battery group 10 including the plurality of stacked battery cells 111 on the cooling plate 20, and placing the case 30 on the upper portion of the battery group 10.

At this time, the case 30 includes the upper cover 310 that covers the upper surface of the plurality of battery cells 111, and the side covers 320 that vertically extend from the upper cover 310 so as to surround the side portions of the plurality of stacked battery cells 111 from which the electrode tabs 111a protrude.

Meanwhile, the case 30 may be formed to have a length corresponding to the length in the direction d1 in which the plurality of battery cells 111 are stacked, and may be formed by an extrusion process.

Specifically, the case 30 may be formed by being extruded in the same direction as the direction d1 in which the plurality of battery cells 111 are stacked. Thereby, even if the number of stacked battery cells 111 changes, the case 30 is formed by extruding in the stacking direction d1 of the battery cell 111, such that the length of the case 30 may be freely increased or decreased regardless of the number of stacked battery cells 111. At this time, forming the case 30 is not limited to the case of performed by the extrusion process, but may be formed by at least one of extrusion, pressing, and bending processes.

In addition, any one of the surface pressure pad 112 and the flame retardant pad 112' may be disposed between one or more battery cells 111 among the plurality of battery cells 111 stacked during stacking the plurality of battery cells 111, and the barriers 120 having a predetermined rigidity may be disposed between the predetermined number of adjacent battery cells 111 stacked on each other. Thereby, the structural rigidity of the battery module 1 may be secured, and a risk such as fire transference may be prevented. The surface pressure pad 112, the flame retardant pad 112' and the barrier 120 are the same as those described above, and therefore will not be described in detail herein.

In addition, the thermal conductive member may be applied to at least one of the cooling plate 20 and the plurality of battery cells 111 during placing the battery group 10 on the cooling plate 20. Specifically, after the thermal conductive member is applied to the cooling plate 20, the battery group 10 may be placed thereon, or conversely, the thermal conductive member may be applied to a bottom surface of the plurality of battery cells 111 in a state in which the battery group 10 is turned upside down, then the cooling plate 20 is placed on the battery module 10.

Since the thermal conductive member is applied in a state in which the upper portion of the cooling plate 20 and the lower portions of the plurality of battery cells 111 of battery group 10 are opened as described above, the process of applying the thermal conductive member may be visually conformed, and an applying amount of the thermal conductive member and an applying section may be easily controlled between the processes of applying the thermal conductive member. Further, the thermal conductive member may be applied only to the required section, such that an amount of the thermal conductive member to be used may be minimized. Furthermore, since the battery group 10 and the cooling plate 20 come into surface contact with each other after the application of the thermal conductive member, the thermal conductive member may be located between the battery group 10 and the cooling plate 20 in a thinly spread state, and by using a minimum amount of the thermal conductive member, it is possible to apply the thermal conductive member having sufficient adhesion and thermal conductivity. Furthermore, the battery group 10 may be pressed to the cooling plate 20 side through the elastic pads 330 of the case 30, and the thermal conductive member may be thinly spread, such that the surface contact between the battery group 10 and the cooling plate 20 may be increased.

In addition, before coupling the case 30 with the cooling plate 20, the bus bar assembly 50 may be fastened to the battery group 10 to be electrically connected to the electrode tabs 111a of the plurality of battery cells 111.

Specifically, after the battery group 10 and the bus bar assembly 50 are coupled to each other, at least one bus bar 510 and the electrode tabs 111a contacting with the bus bar 510 of the bus bar assembly 50 may be electrically connected to each other through welding or the like.

At this time, the bus bar assembly 50 is formed by coupling at least one bus bar 510 and the bus bar frame 520, and then is fastened to the battery group 10 in the coupled state, such that a process, in which the separate bus bars 510 are attached and connected to each electrode tab 111a of the adjacent disposed battery cells 111 among the plurality of battery cells 111, is omitted. In addition, the bus bar assembly 50 including one or more bus bars 510 disposed at a predetermined interval are fastened to the battery group 10 side, then the bus bars 510 and the electrode tabs 111a are connected to each other, such that operation efficiency during manufacturing the battery module 1 may be largely increased.

Further, as described above, the sensing unit 530 including the first sensing member 531 and the second sensing member 532 is integrally provided at a predetermined position in the bus bar assembly 50. Therefore, when fastening the bus bar assembly 50 to the battery group 10, sensing materials 331 and 332 may come into contact and be fixed to desired positons of the plurality of battery cells 111.

Thereby, operation time and costs that have been conventionally consumed for attaching the sensing unit 530 to the desired position of the battery cell 111 to measure the temperature of the battery cells 111 may be largely reduced.

Furthermore, as described above, since the first sensing member 531 is elastically supported by the first support member 541, as the bus bar assembly 50 and the battery group 10 are fastened to each other, the first sensing member 531 may come into close contact with the side portion of the battery cell 111 by the repulsive force of the first support member 541. In addition, the second sensing member 532 may come into close contact with the upper portion of the battery cell 111 by the elastic pad 330 of the case 30 during placing the case 30 on the battery group 10 as described above.

That is, an increase in the adhesion may be obtained by simply tightening the battery group 10, the bus bar assembly 50, and the case 30, such that additional operations, members, and the like for bringing into close contact the first sensing member 531 with the second sensing member 532 are not required, and thereby time and costs during manufacturing may be largely reduced.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the embodiments, but be defined by the appended claims as well as equivalents thereof.

DESCRIPTION OF REFERENCE NUMERALS

1: Battery module
10: Battery group
110: Subgroup
111: Battery cell
111a: Electrode tab
111b: Cell body
112: Surface pressure pad
112': Flame retardant pad
120: Barrier
20: Cooling plate
210: Mounting groove
30: Case
310: Upper cover
311: Module fastening part
320: Side cover
330: Elastic pad
40: Front and rear covers
50: Bus bar assembly
510: Bus bar
520: Bus bar frame
530: Sensing unit
531: First sensing member
532: Second sensing member
533: Connector
534: Cover member
540: Support unit
541: First support member
542: Second support member
60: Bus bar cover
d1: Stacking direction of battery cells

What is claimed is:

1. A battery module comprising:
a battery group including a plurality of battery cells stacked on each other, wherein each of the plurality of battery cells includes a cell body which houses an electrode assembly and an electrode tab which protrudes from the cell body;
a cooling plate which is located in contact with one side of the battery group to cool the plurality of battery cells;
a case which is located on an other side of the battery group so as to surround the battery group;
at least one bus bar which is connected to the electrode tabs of adjacent battery cells among the plurality of battery cells to electrically connect the adjacent battery cells with each other;
a bus bar frame for securing the at least one bus bar on the bus bar frame, the bus bar frame being elongated in a longitudinal direction in which the plurality of battery cells are stacked;
a first support member coupled to the bus bar frame and protruding toward the battery group from an inner surface of the bus bar frame; and
a first sensing member coupled to the first support member and positioned between the electrode tabs of the adjacent battery cells for measuring a temperature of the battery cells,
wherein the inner surface of the bus bar frame faces the cell body of each of the plurality of battery cells, and
wherein at least a portion of the first sensing member is disposed between the first support member and the cell body of at least one battery cell of the plurality of battery cells.

2. The battery module according to claim 1, wherein the case is formed as an integrated structure having a length corresponding to a length in the direction in which the plurality of battery cells of the battery group are stacked.

3. The battery module according to claim 1, wherein the battery group includes barriers which are disposed between subgroups in which a predetermined number of the battery cells are stacked, and have a predetermined rigidity.

4. The battery module according to claim 1, wherein the battery group includes at least one of a surface pressure pad and a flame retardant pad, which are sandwiched between at least one pair of adjacent battery cells.

5. The battery module according to claim 4, wherein the at least one of the surface pressure pad and the flame retardant pad is sandwiched between at least two bundles of the battery cells, and
wherein battery cells facing each other without the at least one of the surface pressure pad and the flame retardant pad positioned therebetween are bonded to each other.

6. The battery module according to claim 1, wherein a thermal conductive member is located between the battery group and the cooling plate to increase a contact area between the battery group and the cooling plate.

7. The battery module according to claim 1, wherein the case includes an elastic pad disposed on one side of an upper cover to press the battery group to the cooling plate side.

8. The battery module according to claim 1, further comprising: a second sensing member which is located in contact with the upper surface of at least one battery cell of the plurality of battery cells to measure a temperature of an upper side of the battery cell.

9. The battery module according to claim 1, wherein the first sensing member is elastically supported by the first support member, and wherein the first sensing member comes in contact with the cell body of at least one battery cell of the plurality of battery cells.

* * * * *